(12) United States Patent  (10) Patent No.: US 8,561,125 B2
Alkan et al.  (45) Date of Patent: Oct. 15, 2013

(54) HOME NETWORK FREQUENCY CONDITIONING DEVICE AND METHOD

(75) Inventors: Erdogan Alkan, Fayetteville, NY (US); Steven K. Shafer, Chittenango, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 22 days.

(21) Appl. No.: 13/180,100

(22) Filed: Jul. 11, 2011

(65) Prior Publication Data

US 2012/0054819 A1  Mar. 1, 2012

Related U.S. Application Data

(60) Provisional application No. 61/378,131, filed on Aug. 30, 2010.

(51) Int. Cl.
*H04N 7/16* (2011.01)
*H04N 7/173* (2011.01)
*H04N 7/18* (2006.01)

(52) U.S. Cl.
USPC ............. 725/153; 725/133; 725/74; 725/127; 725/78

(58) Field of Classification Search
USPC .............. 725/78, 133, 74, 153, 127; 375/132; 330/134; 327/134; 348/731
See application file for complete search history.

(56) References Cited

U.S. PATENT DOCUMENTS

| | | |
|---|---|---|
| 2,662,217 A | 12/1953 | Roberts |
| 3,790,909 A | 2/1974 | Le Fevre |
| 3,939,431 A | 2/1976 | Cohlman |
| 4,306,403 A | 12/1981 | Hubbard et al. |
| 4,344,499 A | 8/1982 | van der Lely et al. |
| 4,418,424 A | 11/1983 | Kawamoto et al. |
| 4,512,033 A | 4/1985 | Schrock |
| 4,520,508 A | 5/1985 | Reichert, Jr. |
| 4,521,920 A | 6/1985 | Forsberg et al. |
| 4,648,123 A | 3/1987 | Schrock |

(Continued)

FOREIGN PATENT DOCUMENTS

| | | |
|---|---|---|
| JP | 55-080989 A | 6/1980 |
| JP | 55-132126 A | 10/1980 |

(Continued)

OTHER PUBLICATIONS

PCT/US2010/049568 International Search Report May 31, 2011.

*Primary Examiner* — Pankaj Kumar
*Assistant Examiner* — Tariq Gbond
(74) *Attorney, Agent, or Firm* — Hiscock & Barclay LLP

(57) ABSTRACT

An in-home entertainment network conditioning device for use with a coaxial device in a CATV network includes an input node adapted to conduct CATV signals in a first and second frequency range, and in-home entertainment signals in a third frequency range that is different from the first frequency range and the second frequency range. The device includes a first signal path branched from the input node that includes a low-pass filter adapted to conduct the CATV signals and reject the in-home entertainment signals. A second signal path in parallel electrical communication with the first signal path includes a high-pass filter in series electrical connection with a signal conditioning circuit. The high-pass filter is adapted to conduct the in-home entertainment signals and reject the CATV signals. The signal conditioning circuit attenuates and equalizes the in-home entertainment signals when coupled to the coaxial device.

19 Claims, 6 Drawing Sheets

(56) References Cited

U.S. PATENT DOCUMENTS

| | | | |
|---|---|---|---|
| 4,677,390 A | 6/1987 | Wagner | |
| 4,715,012 A | 12/1987 | Mueller, Jr. | |
| 4,961,218 A | 10/1990 | Kiko | |
| 4,982,440 A | 1/1991 | Dufresne et al. | |
| 5,010,399 A | 4/1991 | Goodman et al. | |
| 5,126,686 A * | 6/1992 | Tam | 330/134 |
| 5,126,840 A | 6/1992 | Dufresne et al. | |
| 5,214,505 A | 5/1993 | Rabowsky et al. | |
| 5,231,660 A | 7/1993 | West, Jr. | |
| 5,235,612 A | 8/1993 | Stilwell et al. | |
| 5,245,300 A | 9/1993 | Sasaki et al. | |
| 5,345,504 A | 9/1994 | West, Jr. | |
| 5,361,394 A | 11/1994 | Shigihara | |
| 5,369,642 A | 11/1994 | Shioka et al. | |
| 5,389,882 A | 2/1995 | I'Anson et al. | |
| 5,485,630 A | 1/1996 | Lee et al. | |
| 5,548,255 A | 8/1996 | Spielman | |
| 5,557,319 A | 9/1996 | Gurusami et al. | |
| 5,557,510 A | 9/1996 | McIntyre et al. | |
| 5,740,044 A | 4/1998 | Ehrenhardt et al. | |
| 5,745,836 A | 4/1998 | Williams | |
| 5,745,838 A | 4/1998 | Tresness et al. | |
| 5,815,794 A | 9/1998 | Williams | |
| 5,818,825 A | 10/1998 | Corrigan et al. | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,956,075 A | 9/1999 | Matsuo | |
| 5,970,053 A | 10/1999 | Schick et al. | |
| 6,012,271 A | 1/2000 | Wilkens et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,101,932 A | 8/2000 | Wilkens | |
| 6,128,040 A | 10/2000 | Shinbori et al. | |
| 6,129,187 A | 10/2000 | Bellanger et al. | |
| 6,160,990 A | 12/2000 | Kobayashi et al. | |
| 6,173,225 B1 | 1/2001 | Stelzle et al. | |
| 6,185,432 B1 | 2/2001 | Vembu | |
| 6,205,138 B1 | 3/2001 | Nihal et al. | |
| 6,229,375 B1 * | 5/2001 | Koen | 327/351 |
| 6,253,077 B1 | 6/2001 | Burt et al. | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,430,904 B1 | 8/2002 | Coers et al. | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,546,705 B2 | 4/2003 | Scarlett et al. | |
| 6,550,063 B1 * | 4/2003 | Matsuura | 725/133 |
| 6,560,778 B1 | 5/2003 | Hasegawa | |
| 6,570,914 B1 | 5/2003 | Ichihara | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,725,463 B1 | 4/2004 | Birleson | |
| 6,728,968 B1 | 4/2004 | Abe et al. | |
| 6,737,935 B1 | 5/2004 | Shafer | |
| 6,757,910 B1 | 6/2004 | Bianu | |
| 6,758,292 B2 | 7/2004 | Shoemaker | |
| 6,804,828 B1 | 10/2004 | Shibata | |
| 6,843,044 B2 | 1/2005 | Clauss | |
| 6,845,232 B2 | 1/2005 | Darabi | |
| 6,868,552 B1 | 3/2005 | Masuda et al. | |
| 6,877,166 B1 | 4/2005 | Roeck et al. | |
| 6,880,170 B1 | 4/2005 | Kauffman et al. | |
| 6,915,530 B1 | 7/2005 | Kauffman et al. | |
| 6,920,614 B1 | 7/2005 | Schindler et al. | |
| 6,928,175 B1 | 8/2005 | Bader et al. | |
| 6,942,595 B2 | 9/2005 | Hrazdera | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,048,106 B2 | 5/2006 | Hou | |
| 7,127,734 B1 | 10/2006 | Amit | |
| 7,162,731 B2 | 1/2007 | Reidhead et al. | |
| 7,167,693 B2 | 1/2007 | Bachman et al. | |
| 7,254,827 B1 | 8/2007 | Terreault | |
| 7,283,479 B2 | 10/2007 | Ljungdahl et al. | |
| 7,399,255 B1 | 7/2008 | Johnson et al. | |
| 7,404,355 B2 | 7/2008 | Viaud et al. | |
| 7,416,068 B2 | 8/2008 | Ray et al. | |
| 7,454,252 B2 | 11/2008 | El-Sayed | |
| 7,464,526 B2 | 12/2008 | Coenen | |
| 7,505,819 B2 | 3/2009 | El-Sayed | |
| 7,508,284 B2 | 3/2009 | Shafer | |
| 7,530,091 B2 | 5/2009 | Vaughan | |
| 7,592,883 B2 | 9/2009 | Shafer | |
| 7,603,693 B2 | 10/2009 | Masuda et al. | |
| 7,742,777 B2 | 6/2010 | Strater et al. | |
| 7,748,023 B2 | 6/2010 | Weinstein et al. | |
| 8,001,579 B2 | 8/2011 | Olson et al. | |
| 8,213,457 B2 | 7/2012 | Kelma et al. | |
| 8,286,209 B2 * | 10/2012 | Egan, Jr. et al. | 725/74 |
| 2001/0016950 A1 | 8/2001 | Matsuura | |
| 2002/0141347 A1 | 10/2002 | Harp et al. | |
| 2002/0141494 A1 | 10/2002 | Chappell | |
| 2002/0144292 A1 | 10/2002 | Uemura et al. | |
| 2002/0166124 A1 | 11/2002 | Gurantz et al. | |
| 2002/0174423 A1 | 11/2002 | Fifield et al. | |
| 2002/0174435 A1 | 11/2002 | Weinstein et al. | |
| 2003/0084458 A1 | 5/2003 | Ljungdahl et al. | |
| 2004/0076192 A1 | 4/2004 | Zerbe et al. | |
| 2004/0147273 A1 | 7/2004 | Morphy | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0047051 A1 | 3/2005 | Marland | |
| 2005/0144649 A1 | 6/2005 | Bertonis et al. | |
| 2005/0155082 A1 | 7/2005 | Weinstein et al. | |
| 2005/0183130 A1 | 8/2005 | Sadja et al. | |
| 2005/0210977 A1 | 9/2005 | Yan | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0041918 A9 | 2/2006 | Currivan et al. | |
| 2006/0148406 A1 | 7/2006 | Strater et al. | |
| 2006/0191359 A1 | 8/2006 | Tarasinski et al. | |
| 2006/0205442 A1 | 9/2006 | Phillips et al. | |
| 2006/0241838 A1 | 10/2006 | Mongiardo et al. | |
| 2006/0282871 A1 | 12/2006 | Yo | |
| 2007/0024393 A1 | 2/2007 | Forse et al. | |
| 2007/0288981 A1 | 12/2007 | Mitsuse et al. | |
| 2007/0288982 A1 | 12/2007 | Donahue | |
| 2008/0001645 A1 * | 1/2008 | Kuroki | 327/231 |
| 2008/0022344 A1 | 1/2008 | Riggsby | |
| 2008/0040764 A1 | 2/2008 | Weinstein et al. | |
| 2008/0075012 A1 | 3/2008 | Zielinski et al. | |
| 2008/0120667 A1 | 5/2008 | Zaltsman | |
| 2008/0127287 A1 | 5/2008 | Alkan et al. | |
| 2008/0157898 A1 | 7/2008 | Palinkas et al. | |
| 2008/0247401 A1 | 10/2008 | Bhal et al. | |
| 2008/0247541 A1 | 10/2008 | Cholas et al. | |
| 2008/0271094 A1 | 10/2008 | Kliger et al. | |
| 2008/0313691 A1 | 12/2008 | Cholas et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2009/0153263 A1 | 6/2009 | Lin | |

(56) References Cited

U.S. PATENT DOCUMENTS

| | | |
|---|---|---|
| 2009/0154369 A1 | 6/2009 | Helvig et al. |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0316608 A1 | 12/2009 | Singh et al. |
| 2009/0320085 A1 | 12/2009 | Wang |
| 2010/0100912 A1 | 4/2010 | Olson et al. |
| 2010/0100921 A1 | 4/2010 | Olson et al. |
| 2010/0146564 A1* | 6/2010 | Halik et al. ............... 725/78 |
| 2010/0194489 A1* | 8/2010 | Kearns et al. ............. 333/116 |
| 2010/0225813 A1 | 9/2010 | Hirono et al. |
| 2010/0266000 A1 | 10/2010 | Froimovich et al. |
| 2011/0010749 A1 | 1/2011 | Alkan |
| 2011/0051014 A1* | 3/2011 | Wang et al. ............... 348/731 |
| 2011/0069740 A1* | 3/2011 | Cowley et al. ............. 375/132 |
| 2011/0072472 A1* | 3/2011 | Wells et al. ................ 725/78 |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2011/0110452 A1* | 5/2011 | Fukamachi et al. ....... 375/267 |
| 2012/0081190 A1 | 4/2012 | Rijssemus |

FOREIGN PATENT DOCUMENTS

| | | |
|---|---|---|
| JP | 55132126 | 10/1980 |
| JP | 58-99913 | 12/1981 |
| JP | 57-091055 A | 6/1982 |
| JP | 57091055 | 6/1982 |
| JP | 58-101582 A | 6/1983 |
| JP | 58-99913 | 7/1983 |
| JP | 59026709 | 8/1984 |
| JP | 61-157035 A | 7/1986 |
| JP | 61157035 | 7/1986 |
| JP | 05-191416 | 7/1993 |
| JP | 07-038580 A | 2/1995 |
| JP | 11-069334 A | 3/1999 |
| JP | 11069334 | 3/1999 |
| JP | 2001-177580 A | 6/2001 |
| JP | 2004-080483 | 3/2004 |
| JP | 2005-005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

* cited by examiner

HOME NETWORK FREQUENCY CONDITIONING DEVICE AND METHOD

CROSS REFERENCE TO RELATED APPLICATION

This application claims priority to U.S. Provisional Patent Application to Alkan, et al, entitled "Home Network Frequency Conditioning Device and Method," Ser. No. 61/378,131, filed Aug. 30, 2010, the disclosure of which is hereby incorporated entirely herein by reference.

FIELD OF THE INVENTION

This disclosure relates generally to community access or cable television (CATV) networks and to in-home entertainment networks. More particularly, the present disclosure relates to a conditioning device for improving the frequency response of signals conducted within an in-home cable infrastructure that includes both CATV bandwidth and in-home entertainment bandwidth.

BACKGROUND OF THE INVENTION

Community access television, or cable television, (CATV) networks use an infrastructure of interconnected coaxial cables, splitters, amplifiers, filters, trunk lines, cable taps, drop lines and other signal-conducting devices to supply and distribute high frequency "downstream" signals from a main signal distribution facility, known as a head-end, toward subscriber premises such as homes and businesses. The downstream signals operate the subscriber equipment, such as television sets, telephones, and computers. The typical CATV network is a two-way communication system. CATV networks also transmit "upstream" signals from the subscriber equipment back to the head-end of the CATV network. For example, upstream bandwidth may include data related to video-on-demand services, such as video requests and billing authorization. Two-way communication is also utilized when using a personal computer connected through the CATV infrastructure to the public Internet, for example when sharing photo albums or entering user account information. In yet another example, voice over Internet protocol (VOIP) telephones and security monitoring equipment use the CATV infrastructure and the public Internet as the communication medium for transmitting two-way telephone conversations and monitoring functions.

To permit simultaneous communication of upstream and downstream CATV signals and the interoperability of the subscriber equipment and the equipment associated with the CATV network infrastructure outside of subscriber premises, the downstream and upstream CATV signals are confined to two different frequency bands. In most CATV networks the downstream frequency band, or downstream bandwidth, is within the range of 54-1002 megahertz (MHz) and the upstream frequency band, or upstream bandwidth, is within the range of 5-42 MHz.

The downstream signals are delivered from the CATV network infrastructure to the subscriber premises at a CATV entry adapter, which is also commonly referred to as an entry device, terminal adapter or a drop amplifier. The entry adapter is a multi-port device which connects at a premises entry port to a CATV drop cable from the CATV network infrastructure. The entry adapter connects at a multiplicity of other distribution ports to coaxial cables which extend throughout the subscriber premises to a cable outlet. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable and the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. In another example, receivers of satellite-broadcast signals may be distributed for viewing or listening throughout the home. These types of devices, including the more-conventional television sets, telephone sets and devices connected to the Internet by the CATV network, are generically referred to as multimedia devices.

An in-home entertainment network may be coupled to the CATV network via the same coaxial cable delivering the downstream and upstream bandwidth of the CATV system. The in-home entertainment network can be a network providing multiple streams of high definition video and gaming entertainment. Examples of in-home entertainment network technologies include Ethernet, HomePlug, Home Phoneline Networking Alliance (HPNA), Multimedia over Coax Alliance (MoCA) and 802.11n protocols. The in-home entertainment (IHE) network is coupled to the CATV network within a subscriber premises to allow the CATV network to distribute IHE signals from one multimedia device to another within the subscriber premises.

Since the operation of the subscriber premises IHE network must occur simultaneously with the operation of the CATV services, the IHE signals often utilize a frequency range different from the frequency ranges of the CATV upstream and downstream signals. A typical IHE frequency band is 1125-1675 MHz, which is referred to in this document as the multimedia-over-coax frequency range, or bandwidth. A specific IHE network technology can includes other frequency ranges, but the 1125 to 1675 MHz frequency range is of major relevance because of its principal use in establishing connections between the multimedia devices within a subscriber network.

Although using the in-home cable infrastructure as the communication medium substantially simplifies the implementation of the IHE network, there are certain disadvantages to doing so. One noted problem arises when multimedia-over-coax signals pass backwards through a conventional splitter en route to another multimedia-over-coax-enabled device within the network. The CATV network and the in-home cable infrastructure were originally intended for the distribution of CATV signals. The typical in-home cable infrastructure uses signal splitters to divide CATV downstream signals into multiple CATV downstream paths and to combine multiple CATV upstream signals into a single CATV upstream path. The CATV entry adapter was not originally intended to communicate multimedia-over-coax signals between its ports, as is necessary to achieve multimedia-over-coax signal communication in the IHE network. To implement the IHE network, the multimedia-over-coax signals must traverse between separate signal component legs of a signal splitter/combiner which are connected to the multiple ports.

The typical signal splitter has a high degree of signal rejection or isolation between its separate signal component legs. When the multimedia-over-coax signals traverse between the separate signal component legs of the splitter, the degree of signal rejection or isolation greatly attenuates the strength of the multimedia-over-coax signals. This it is desirable to have a system which transmits both CATV and IHE signals without attenuating or rejecting the IHE signals to a large degree.

Some IHE network communication protocols recognizes the possibility of variable strength multimedia-over-coax signals and provide the capability to boost the strength of multimedia-over-coax signals to compensate for the variable strength of the multimedia-over-coax signals that are communicated between multimedia-over-coax-enabled devices. However, boosting the strength of the multimedia-over-coax signal can result in the strength or power of the multimedia-over-coax signals being substantially greater than the strength or power of the CATV signals communicated within the subscriber premises. Consequently, the multimedia-over-coax signals have the capability of adversely affecting the proper functionality of standard CATV subscriber equipment, such as a digital video recorder or an embedded multimedia terminal adapter (eMTA). This it is desirable to have a device for use in a CATV network which conditions the IHE signals transmitted through the network such that the IHE signals will not be rejected, without adversely affecting the CATV communication occurring simultaneously on the CATV network.

SUMMARY OF THE INVENTION

In one aspect of the invention, an in-home entertainment network conditioning device for use with a coaxial device is provided. The conditioning device includes an input node adapted to conduct CATV signals and in-home entertainment signals. The CATV signals include downstream signals in a first frequency range and upstream signals in a second frequency range that is different from the first frequency range. The in-home entertainment signals include signals in a third frequency range that is different from the first frequency range and the second frequency range.

The home entertainment network conditioning device further includes a first signal path branched from the input node. The first signal path includes a low-pass filter, wherein the low-pass filter is adapted to conduct the CATV signals and reject the in-home entertainment signals.

The home entertainment network conditioning device further includes a second signal path branched from the input node and in parallel electrical communication with the first signal path. The second signal path includes a high-pass filter, wherein the high-pass filter is in series electrical connection with a signal conditioning circuit. The high-pass filter is adapted to conduct the in-home entertainment signals and reject the CATV signals. The signal conditioning circuit is configured to attenuate and equalize the in-home entertainment signals when coupled to the coaxial device. The home entertainment network conditioning device further includes an output node joining the first signal path and the second signal path.

In another aspect of the invention a signal conditioning circuit for use in a CATV network device is disclosed. The signal conditioning circuit includes an equalizer and an attenuator. In some embodiments the equalizer has a positive gain slope in an in-home entertainment signal frequency band. In some embodiments the attenuator includes resistive elements. In some embodiments the resistive elements are a Pi-type attenuator. In some embodiments the signal conditioning circuit attenuates in-home entertainment signals an amount in the range of −1 dB to −30 dB in response to being coupled to the CATV network device. In some embodiments the signal conditioning circuit attenuates in-home entertainment signals an amount in the range of −5 dB to −10 dB in response to being coupled to the CATV network device. In some embodiments the in-home entertainment signals have a frequency range of 1125 MHz to 1675 MHz.

In another aspect of the invention, a method of conditioning in-home entertainment signals in a CATV network device is disclosed. The method includes a step of providing an in-home entertainment network conditioning device. The conditioning device includes an input node and an output node, a first signal path and a second signal path branched from the input node, and rejoining at the output node. The first signal path and the second signal path are in parallel electrical connection. The first signal path is adapted to conduct CATV signals and reject in-home entertainment signals. The second signal path is adapted to conduct the in-home entertainment signals and reject the CATV signals. In some embodiments the first signal path includes a low-pass filter. In some embodiments the second signal path includes a high-pass filter is series electrical connection with a signal conditioning circuit. In some embodiments the signal conditioning circuit includes an attenuator and an equalizer. In some embodiments the equalizer has a positive gain slope in the in-home entertainment signal frequency range. In some embodiments the in-home entertainment signal frequency range is from 1125 MHz to 1675 MHz. In some embodiments the attenuator includes resistive elements.

The method further includes the step of coupling the in-home entertainment network conditioning device to the CATV network device.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
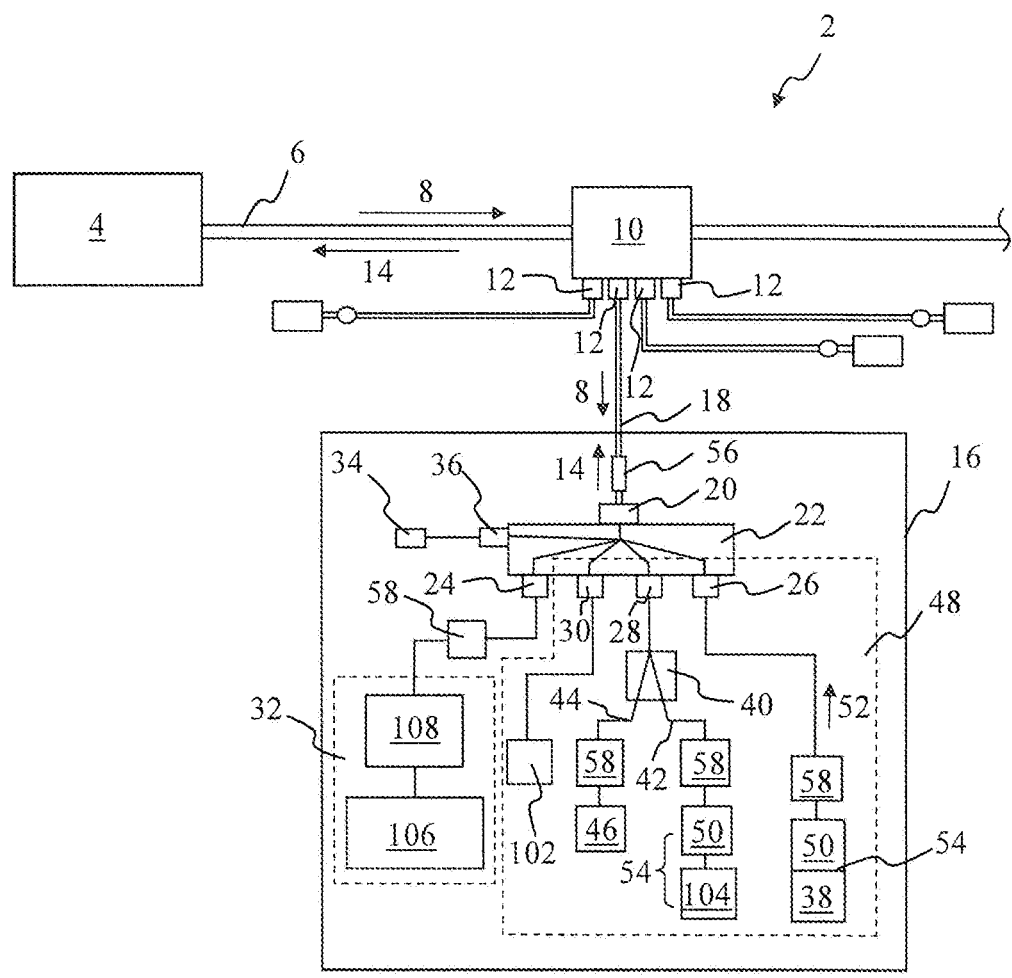
FIG. 1 shows a simplified schematic view of a CATV network according to one embodiment of the invention.

Community access television, or cable television, (CATV) networks use an infrastructure of interconnected coaxial cables, splitters, amplifiers, filters, trunk lines, cable taps, drop lines and other signal-conducting devices to supply and distribute high frequency "downstream" signals from a main signal distribution facility, known as a head-end, toward subscriber premises such as homes and businesses. The downstream signals operate the subscriber equipment, such as television sets, telephones, and computers. The typical CATV network is a two-way communication system. CATV networks also transmit "upstream" signals from the subscriber equipment back to the head-end of the CATV network. For example, upstream bandwidth may include data related to video-on-demand services, such as video requests and billing authorization. Two-way communication is also utilized when using a personal computer connected through the CATV infrastructure to the public internet, for example when sharing photo albums or entering user account information. In yet another example, voice-over-Internet protocol (VOIP) telephones and security monitoring equipment use the CATV infrastructure and the public internet as the communication medium for transmitting two-way telephone conversations and monitoring functions.

To permit simultaneous communication of upstream and downstream CATV signals and the interoperability of the subscriber equipment and the equipment associated with the CATV network infrastructure outside of subscriber premises, the downstream and upstream signals are confined to two different frequency bands. In most CATV networks the downstream frequency band, or downstream bandwidth, is within the range of 54-1002 megahertz (MHz) and the upstream frequency band, or upstream bandwidth, is within the range of 5-42 MHz.

The downstream signals are delivered from the CATV network infrastructure to the subscriber premises at a CATV entry adapter, which is also commonly referred to as an entry device, terminal adapter or a drop amplifier. The entry adapter is a multi-port device which connects at a premises entry port to a CATV drop cable from the CATV network infrastructure. The entry adapter connects at a multiplicity of other distribution ports to coaxial cables which extend throughout the subscriber premises to a cable outlet. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable and the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. In another example, receivers of satellite-broadcast signals may be distributed for viewing or listening throughout the home. These types of devices, including the more conventional television sets, telephone sets and devices connected to the Internet by the CATV network, are generically referred to as multimedia devices.

An in-home entertainment network may be coupled to the CATV network via the same coaxial cable delivering the downstream and upstream bandwidth of the CATV system. The in-home entertainment network can be a network providing multiple streams of high definition video and gaming entertainment. Examples of in-home entertainment network technologies include Ethernet, HomePlug, Home Phoneline Networking Alliance (HPNA), Multimedia over Coax Alliance (MoCA) and 802.11n protocols. The in-home entertainment (IHE) network is coupled to the CATV network within a subscriber premises to allow the CATV network to distribute IHE signals from one multimedia device to another within the subscriber premises.

In a specific example, the in-home entertainment network may employ technology standards developed to distribute multimedia-over-coax signals within the CATV subscriber premises. Products designed to use multimedia-over-coax signals can be used to create an in-home entertainment network by interconnecting presently-known and future multimedia devices, such as set-top boxes, routers and gateways, bridges, optical network terminals, computers, gaming systems, display devices, printers, network-attached storage, and home automation such as furnace settings and lighting control.

A multimedia-over-coax network uses the in-home coaxial cable infrastructure originally established for distribution of CATV signals within the subscriber premises, principally because that coaxial cable infrastructure already exists in most homes and is capable of carrying much more information than is carried in the CATV frequency bands. A multimedia-over-coax network is established by connecting multimedia-over-coax-enabled or multimedia-over-coax interface devices at the cable outlets in the rooms of the subscriber premises. The multimedia-over-coax interface devices implement a multimedia-over-coax communication protocol which encapsulates the signals normally used by the multimedia devices within multimedia-over-coax signal packets and then communicates the multimedia-over-coax signal packets between other multimedia-over-coax interface devices connected at other cable outlets. The receiving multimedia-over-coax interface device removes the encapsulated multimedia signals from the multimedia-over-coax signal packets, and delivers the multimedia signals to the connected display, computer or other multimedia device from which the content is presented to the user.

Each multimedia-over-coax-enabled device is capable of communicating with every other multimedia-over-coax-enabled device in the in-home or subscriber premises network to deliver the multimedia content throughout the home or subscriber premises. The multimedia content that is available from one multimedia device can be displayed, played or otherwise used at a different location within the home, without having to physically relocate the originating multimedia device from one location to another within the subscriber premises. The communication of multimedia content is considered beneficial in more fully utilizing the multimedia devices present in modem homes.

Since the operation of the subscriber premises IHE network must occur simultaneously with the operation of the CATV services, the multimedia-over-coax signals utilize a frequency range different from the frequency ranges of the CATV upstream and downstream signals. A typical multimedia-over-coax frequency band is 1125-1675 MHz. A particular IHE network frequency band may includes other frequency ranges, but the 1125-1675 MHz band is of major relevance because of its principal use in establishing connections between the multimedia-over-coax interface devices within the CATV network.

Although using the in-home cable infrastructure as the communication medium substantially simplifies the implementation of the IHE network, there are certain disadvantages to doing so. One noted problem arises when multimedia-over-coax signals pass backwards through a conventional splitter en route to another multimedia-over-coax-enabled device within the network. The CATV network and the in-home cable infrastructure were originally intended for the distribution of CATV signals. The typical in-home cable infrastructure uses signal splitters to divide CATV downstream signals into multiple CATV downstream paths and to combine multiple CATV upstream signals into a single CATV upstream path. The CATV entry adapter was not originally intended to communicate multimedia-over-coax signals between its ports, as is necessary to achieve multimedia-over-coax signal communication in the IHE network. To implement the IHE network, the multimedia-over-coax signals must traverse between separate signal component legs of a signal splitter/combiner which are connected to the multiple ports.

The typical signal splitter has a high degree of signal rejection or isolation between its separate signal component legs. When the multimedia-over-coax signals traverse between the separate signal component legs of the splitter, the degree of signal rejection or isolation greatly attenuates the strength of the multimedia-over-coax signals. This it is desirable to have a system which passes both CATV and IHE signals without attenuating or rejecting the IHE signals to a large degree.

Some IHE network communication protocols recognize the possibility of variable strength multimedia-over-coax signals and provide the capability to boost the strength of multimedia-over-coax signals to compensate for the variable strength of the multimedia-over-coax signals that would otherwise be communicated between multimedia-over-coax-enabled devices. However, boosting the strength of the multimedia-over-coax signal can result in the strength or power of the multimedia-over-coax signals being substantially greater than the strength or power of the CATV signals communicated within the subscriber premises. Consequently, the multimedia-over-coax signals have the capability of adversely affecting the proper functionality of standard CATV subscriber equipment, such as a digital video recorder or an embedded multimedia terminal adapter (eMTA). This it is desirable to have a device for use in a CATV network which conditions the IHE signals transmitted through the network such that the IHE signals will not be rejected, without adversely affecting the CATV communication occurring simultaneously on the CATV network.

Referring to FIG. 1, a simplified schematic view of a portion of a community access television or cable television (CATV) network 2 according to one embodiment of the invention is shown, which includes a head-end facility 4 for processing and distributing signals over the network. Head-end facility 4 is typically controlled by a system operator and includes electronic equipment to receive and re-transmit video and other signals over the local cable infrastructure. One or more main distribution lines 6 carry downstream signals 8 from head-end facility 4 to cable tap 10 configured to serve a local distribution network of about 100 to 500 end users, customers, or subscribers. Cable tap 10 includes a plurality of tap ports 12 configured to carry downstream signals 8 and upstream signals 14 to each subscriber premises 16 via a drop cable 18, which may be a single coaxial cable. In one embodiment, upstream signals 14 are in the range of 5-42 MHz and the downstream signals 8 are in the range of 54-1002 MHz.

Drop cable 18 enters subscriber premises 16 and connects to a splitter having a single CATV network connection or entry port 20 and two or more outlet ports. In the disclosed example, the splitter is a 4-way CATV entry adapter 22 that includes four outlet ports 24, 26, 28, and 30. Downstream signals 8 may be delivered to a passive subscriber device 32, such as an embedded multimedia terminal adapter (eMTA) 32 through outlet port 24. An eMTA device combines a high-speed data cable modem 108 with Voice-over-Internet Protocol technology to create a platform that connects analog telephones and terminal equipment (e.g., fax) to the cable operator's advanced Internet protocol communications network. Cable modem 108 provides a data interface for communicating Internet protocol packets to and from the CATV network 2, and an analog telephone adapter provides a voice over Internet protocol (VoIP) interface for analog telephone set 106. The eMTA device 32 converts between analog voice signals and packets. A lifeline telephone is a well known example of an eMTA device.

In some embodiments, distribution ports 26, 28, 30 are active distribution ports and CATV entry adapter 22 delivers downstream signals 8 through the three active distribution ports to various subscriber equipment devices. The active signals may be conducted through a forward path amplifier (not shown), where the amplifier amplifies the strength of the CATV downstream signals, or modifies or conditions some characteristic of those CATV signals, before delivering them from the active ports to the active subscriber equipment. Most subscriber equipment benefits from amplified CATV downstream signals. In this embodiment, electrical power for the CATV entry adapter 22 may be supplied from a conventional DC power supply 34 connected to a dedicated power input port 36. Alternatively, electrical power can be supplied through a conventional power inserter (not shown) that is connected to one of the active ports 26, 28, or 30. The power inserter allows relatively low voltage DC power to be conducted through the same active port that also conducts high frequency signals. Use of a conventional power inserter eliminates the need for a separate dedicated power supply port 36, or provides an alternative port through which electrical power can also be applied. The power supply 34 or the power supplied from the power inserter is typically derived from a conventional wall outlet (not shown) within subscriber premises 16.

In the disclosed example, outlet port 26 conducts and receives CATV signals to and from an IHE network-enabled subscriber device, which in this embodiment is multimedia-over-coax-enabled set top box (STB) 38. Outlet port 28 conducts downstream signals 8 to a conventional splitter 40. Downstream signals 8 are divided and distributed down a first branch 42 to another IHE network-enabled subscriber device, which in this embodiment is multimedia-over-coax-enabled digital video recorder (DVR) 104. A second branch 44 of the splitter 40 distributes the downstream CATV signals 8 to a conventional subscriber device, which in this embodiment is television set 46. Subscriber device 46 is not IHE network-enabled, meaning it is not equipped to process IHE network signals, such as multimedia-over-coax signals. Upstream CATV signals 14 sent from IHE network-enabled subscriber devices 104 and television set 46 (if any) are combined in splitter 40 and delivered out entry port 20 to main distribution line 6. Outlet port 30 distributes downstream CATV signals 8 to a conventional subscriber device, which in this embodiment is personal computer 102.

Subscriber premises 16 further includes an in-home entertainment (IHE) network 48 which, in the disclosed embodiment, is a multimedia-over-coax network which carries signal in a multimedia-over-coax frequency range from 1125 to 1675 MHz. As used herein, an IHE network carries data on existing coaxial cable infrastructure at a spectrum of frequencies or bandwidth separate from the CATV bandwidth. In that regard, the data is not limited to entertainment, and may include security information, personal information, and the like. IHE network 48 interconnects multimedia-over-coax-enabled subscriber devices such as digital video recorder 104, computers 102, data modems, computer game playing devices, television sets 46, television set-top boxes 38, and other audio and visual entertainment devices.

Network 2 shown in FIG. 1 includes low-pass filter 56. Low-pass filter 56 is used to block IHE signals such as the multimedia-over-coax band used in this example, from exiting subscriber network 16 and traveling to head-end 4 or other subscriber premise networks. It is not desirable to have the IHE signals 52 from one subscriber premise be transmitted outside subscriber network 16. Low-pass filter 56 will allow downstream signals 8 and upstream signals 14 to pass through low-pass filter 56, but will reject IHE signals 52, not allowing them to exit subscriber premises 16. Filter 56 is optional, and can be placed in other locations. In some embodiments filter 56 is included in other network devices such as 4-way splitter 22.

Because conventional signal splitters are designed for the CATV band (e.g., 5-1002 MHz), they have non-flat high insertion loss, and non-flat isolation in the IHE bands, in particular in the multimedia-over-coax band of 1125 to 1675 MHz. Additionally, inherent losses in coaxial cables also increase with increasing frequency, resulting in roll-off (e.g., non-flat insertion loss) characteristics in the multimedia-over-coax band. Therefore, multimedia-over-coax signals 52 transmitted between the separate signal component legs of entry adapter 22 or splitter 40 are attenuated in a non-flat fashion or the isolation between the splitter legs will be degraded, which may be undesirable. Some IHE network communication protocols recognizes the attenuation and boost the strength of IHE signals to compensate. However, the boost in signal strength has the adverse result of creating "noise" seen by the non-IHE-enabled subscriber devices. The non-IHE-enabled subscriber devices such as eMTA device 32 or television 46 and cable modem 108 may become overloaded by the noise and may cease to function properly. In the situation wherein eMTA 32 is a lifeline telephone system transmitting security signals to a monitoring company, this situation would be highly undesirable.

Furthermore, IHE signals 52 received by the IHE-enabled subscriber devices may not be at the same power level across the entire multimedia-over-coax frequency band, due to a phenomenon known as roll-off When the controller increases the signal strength of the multimedia-over-coax signals, the end result will still be uneven, which may adversely affect the performance of the IHE device.

Figure 2:
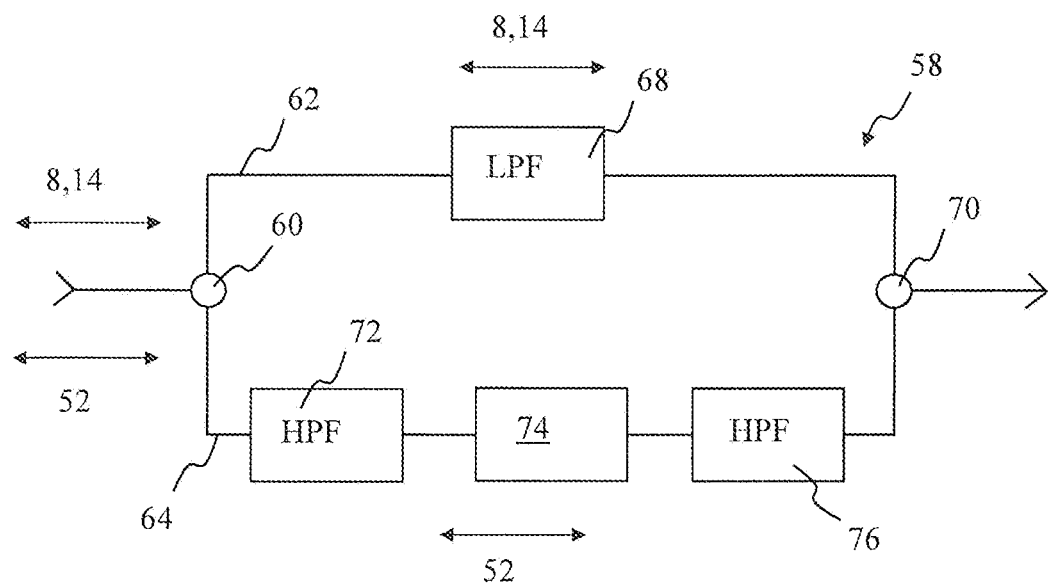
FIG. 2 schematically illustrates an exemplary embodiment of in-home entertainment network conditioning device 58 according to the invention.
Figure 4:
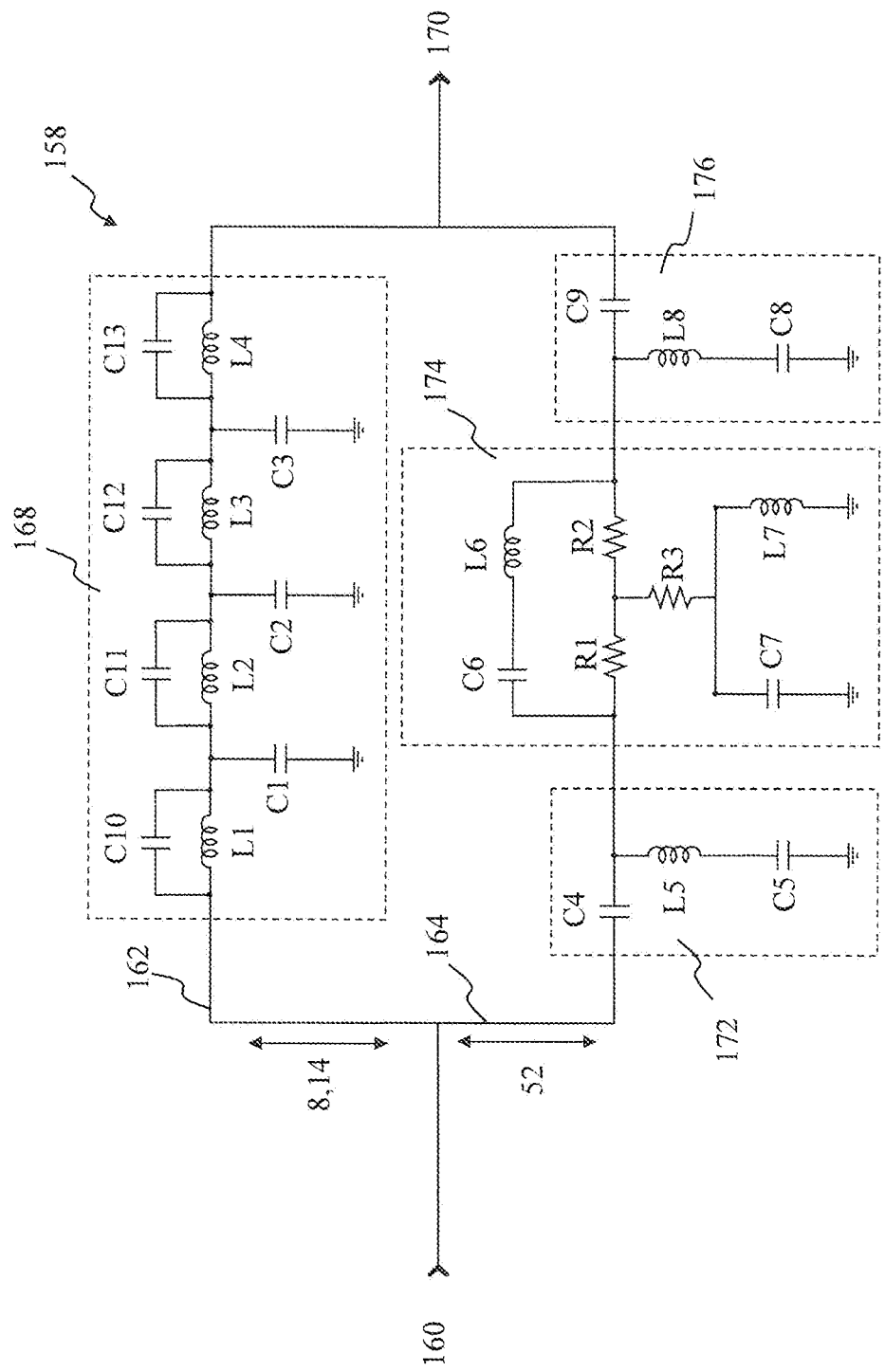
FIG. 4 schematically illustrates an embodiment of in-home entertainment network conditioning device 158 according to the invention.

Disclosed herein is in-home entertainment network conditioning devices according to the invention which overcome the above-mentioned deficiencies. An in-home entertainment network conditioning device according to the invention separates the CATV signals from the in-home entertainment signals and conditions the in-home entertainment signals 52 so that their frequency response within IHE network 48 is flat and the attenuation of signals 52 is not excessive. FIG. 1 shows several in-home entertainment network conditioning devices 58 used on multiple legs of subscriber premise 16 network. FIG. 2 shows one example embodiment of IHE network conditioning device 58 according to the invention. FIG. 4 shows a schematic embodiment of IHE network conditioning device 158 according to the invention. Device 158 of FIG. 4 can be used in place of any of the devices 58 shown in FIG. 1.

Figure 7:
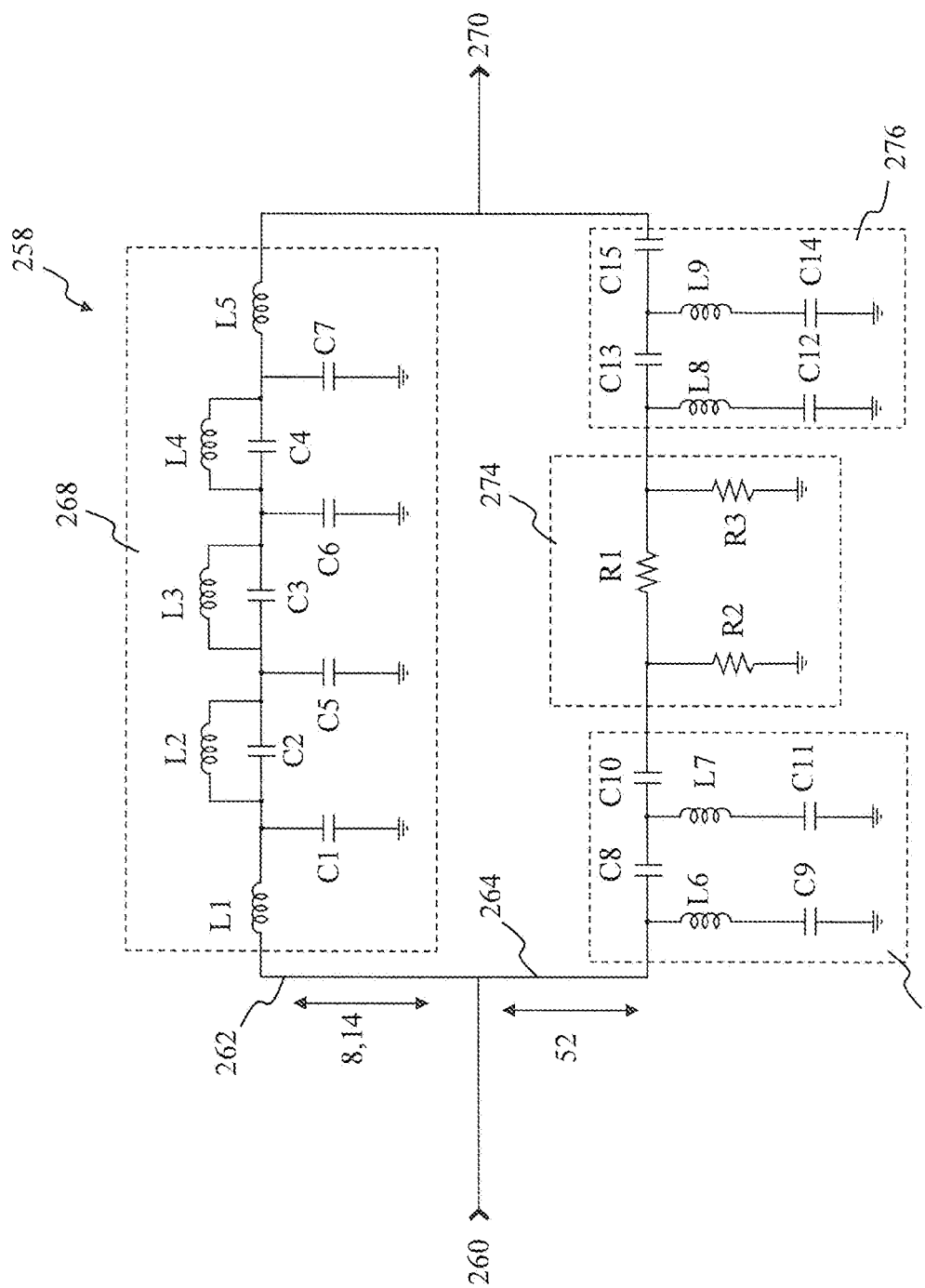
FIG. 7 schematically illustrates an embodiment of in-home entertainment network conditioning device 258 according to the invention.

FIG. 7 shows a schematic embodiment of IHE network conditioning device 258 according to the invention. Device 258 of FIG. 7 can be used in place of any of the devices 58 shown in FIG. 1. IHE network conditioning devices according to the invention, including devices 58, 158, and 258, attenuate and equalize IHE signals 52 to counteract roll-off and so that excessive amplification of signals 52 is not necessary.

Referring to FIG. 2, in-home entertainment network conditioning device 58 is disclosed that, when coupled with a coaxial device such as the distribution port of a splitter or entry adapter, overcomes the above-mentioned deficiencies. Conditioning device 58 includes input node 60, and first signal path 62 and a second signal path 64 branched therefrom. Input node 60 is adapted to conduct CATV downstream signals 8, CATV upstream signals 14, and in-home entertainment signals 52. First signal path 62 includes low-pass filter 68 adapted to conduct CATV signals 8 and 14, and reject in-home entertainment signals 52. First signal path 62 connects to output node 70.

Second signal path 64 is in parallel electrical communication with first signal path 62 and includes high-pass filter 72 in series electrical connection with signal conditioning circuit 74. High-pass filter 72 is adapted to conduct in-home entertainment signals 52 and reject CATV signals 8 and 14. Signal conditioning circuit 74 according to the invention is for use in a CATV network device, or coaxial device. Signal conditioner circuit 74 includes an attenuator. Signal conditioning circuit 74 is configured to attenuate in-home entertainment signals 52 when coupled to a coaxial device such as a splitter, entry adapter, long runs of coaxial cable, or the like. In some embodiments, signal conditioning device 74 includes an equalizer circuit, which is a special attenuator that has a frequency response that is intentionally not flat. In embodiments of signal conditioning circuit 72 according to the invention where signal conditioning circuit 72 includes an equalizer circuit, the frequency response of the in-home entertainment signals 52 is flattened, or equalized, by signal conditioning circuit 74. In one embodiment, second signal path 64 further includes second high-pass filter 76 to either permit conditioning device 58 to operate symmetrically in both directions, or to increase the selectivity between IHE signals 52 and CATV signals 8 and 14.

CATV signals 8 and 14 include CATV downstream signals 8 and CATV upstream signals 14. In one embodiment, CATV downstream signals 8 comprise a first frequency range of 54-1002 MHz, and CATV upstream signals 14 comprise a second frequency range of 5-42 Mhz. In some embodiments in-home entertainment signals 52 comprise a third frequency range of 1125-1675 MHz.

Figure 3:
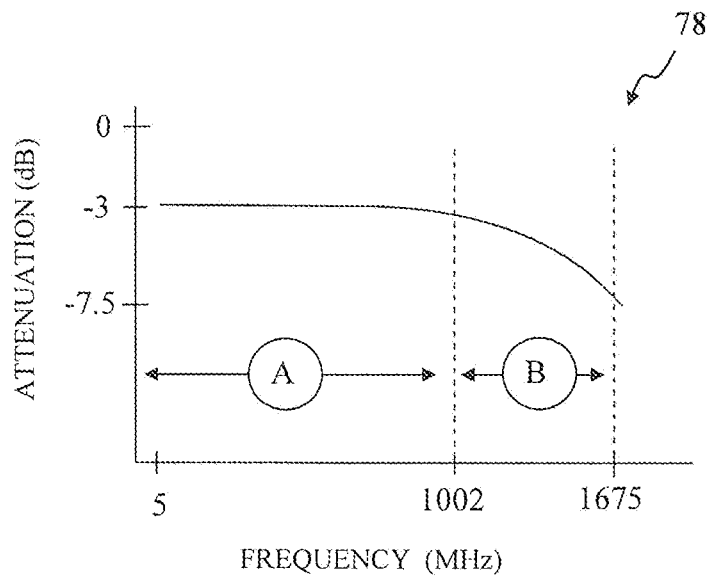
FIG. 3 is a chart showing the insertion loss across the input port and output port of a splitter within the CATV network of FIG. 1.

A characteristic of in-home entertainment network conditioning device 58 is that the frequency response in the in-home entertainment network 48 bandwidth is poor for the transmission of signals, but when coupled with the frequency response of a conventional splitter, the coupled frequency response improves the undesirable characteristics noted hereinabove. For example, FIG. 3 depicts a typical frequency response 78 for a conventional splitter at either of its distribution ports. Frequency response is the calculated gain (or attenuation) of a device in decibels (dB), vs. signal frequency. When the gain is a negative amount of decibels, the gain is often labeled as attenuation. Response 78 is approximately −3 dB across the entire CATV signal bandwidth, which includes CATV downstream signals 8 and CATV upstream signals 14. The CATV bandwidth is denoted by the segment labeled "A". However, response 78 rolls off significantly in the in-home entertainment signal 52 bandwidth, denoted by the segment labeled "B". Accordingly, the response 78 at the higher frequencies (e.g., above 1002 MHz) is significantly attenuated, which may cause in-home entertainment signals 52 in the network to drop out. In addition, there may be poor isolation between the distribution ports of the splitter in the in-home entertainment signal 52 bandwidth, for example −15 dB.

Turning to FIG. 4, wherein like numerals indicate like elements from FIG. 2, a topology for one embodiment of conditioning device 158 includes input node 160 for connection to a distribution port of a coaxial splitter. Conditioning device 158 includes two signal paths 162 and 164, to filter CATV signals 8 and 14, and in-home entertainment signals 52 into separate transmission paths. The two signal paths 162 and 164 are rejoined at output node 170.

First signal path 162 includes low-pass filter 168 adapted to conduct CATV signals 8 and 14, and reject in-home entertainment signals 52. Low-pass filter 168 is a Chebyshev filter circuit in this embodiment that includes inductor/capacitor pairs L1/C10, L2/C11, L3/C12, and L4/C13 connected in series between input node 160 and output node 170. Capacitors C1, C2, and C3 connect to ground the node between inductors L1 and L2, the node between L2 and L3, and the node between L3 and L4 respectively. In some embodiments low-pass filter 168 includes other components. Low-pass filter 168 can take many other forms. In some embodiments low-pass filter 168 is an elliptic filter. In some embodiments low-pass filter 168 is a Butterworth filter. In some embodiments low-pass filter 168 is a maxflat filter. Low-pass filter 168 according to the invention is any filter which conducts CATV downstream signals 8, conducts CATV upstream signals 14, and rejects IHE signals 52.

Second signal path 164 is in parallel electrical communication with first signal path 162. Second signal path 164 includes high-pass filter 172. In the illustrated embodiment, high pass filter 172 is a Chebyshev filter circuit comprising a capacitor C4 in series between input node 160 and output node 170, and an L5/C5 inductor/capacitor series connection to ground. High-pass filter 172 is adapted to conduct in-home entertainment signals 52 and reject CATV downstream signals 8 and CATV upstream signals 14. High-pass filter 172 can take many other forms. In some embodiments high-pass filter 172 is an elliptic filter. In some embodiments high-pass filter 172 is a Butterworth filter. In some embodiments high-pass filter 172 is a maxflat filter. High-pass filter 172 according to the invention is any filter which conducts IHE signals 52 and rejects CATV signals 8 and 14.

In some embodiments, second signal path 164 further includes a second high-pass filter 176 to permit conditioning device 158 to operate symmetrically in both directions. Second high-pass filter 176 can be an elliptic filter, a Chebyshev filter, a Butterworth filter, a maxflat filter, or a different type of filter. Second high-pass filter 172 can be any type of filter which passes in-home entertainment signals 52 and rejects CATV downstream signals 8 and CATV upstream signals 14.

Second signal path 164 further includes signal conditioning circuit 174 in series electrical connection with high-pass filter 172. In some embodiments, signal conditioning circuit 174 is an attenuator circuit. Signal conditioning circuit 174 as shown in FIG. 4 includes an equalizer circuit, which is a special attenuator that has a frequency response that is intentionally not flat. Signal conditioning circuit 174 is configured to attenuate and equalize in-home entertainment signals 152 when coupled to a coaxial device such as a splitter, entry adapter, long coaxial cable run, or the like. In one example, the response of the equalizer 174 has a positive gain slope in the IHE signal 52 frequency band. An exemplary topology for an equalizer 174 producing a response with a positive gain slope in the IHE signal 52 frequency band is shown in FIG. 4. In this embodiment, signal conditioning circuit 174 includes capacitors C6 and C7, inductors L6 and L7, and resistors R1, R2, and R2. In this embodiment signal conditioning circuit 174 includes resistive elements.

Figure 5:
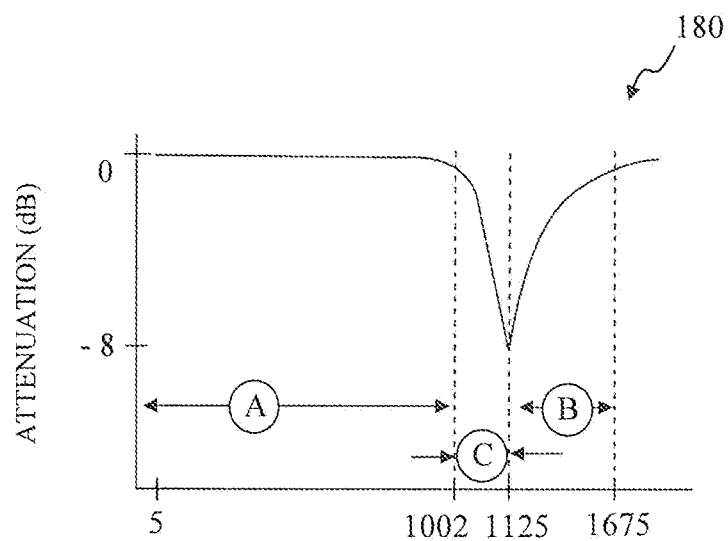
FIG. 5 is a chart showing the frequency response for in-home entertainment network conditioning device 158 of FIG. 4.

FIG. 5 illustrates frequency response 180 for the exemplary conditioning device 158 shown in FIG. 4. Frequency response 180 indicates zero response (e.g., 0 dB) across the entire CATV downstream signal 8 and CATV upstream signal 14 bandwidth (e.g., 0-1002 MHz), denoted by the segment labeled "A". The conditioning circuit response 180 drops to approximately −8 dB across a transition zone labeled "C". The transition zone (e.g., 1002-1125 MHz) does not carry either CATV signals 8 or 14 or in-home entertainment signals 52. Response 180 of conditioning device 158 has a positive gain (attenuation) slope in the in-home entertainment signal 52 frequency range of 1125 to 1675 MHz, labeled "B". As illustrated, response 180 is approximately −8 dB at 1125 MHz, and increases along a positive slope to approximately zero dB at 1675 MHz.

Figure 6:
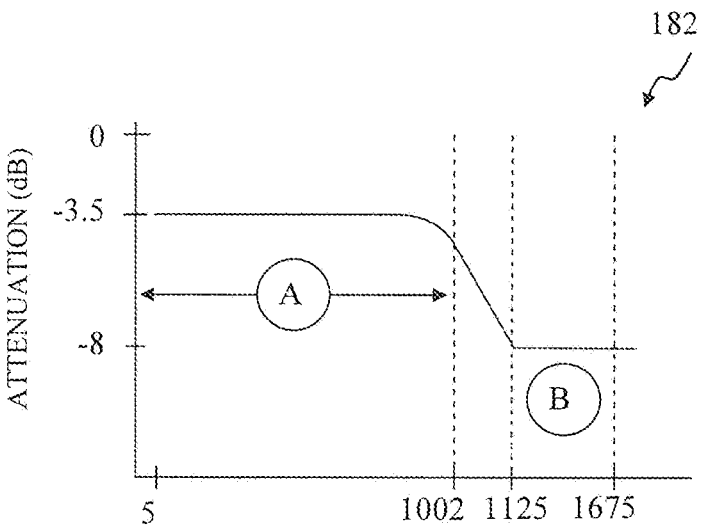
FIG. 6 is a chart showing the frequency response for in-home entertainment network conditioning device 158 of FIG. 4 when coupled to the splitter of FIG. 1.

Referring to FIG. 6, combined response 182 is shown for an embodiment of a conditioning device according to the invention coupled to a distribution port of a coaxial device such as a conventional splitter, such as the splitter 40 illustrated in FIG. 1. Combined response 182 combines the individual responses of the conventional splitter, as shown in FIG. 3, and the response of signal conditioning device 58 or 158, as shown in FIG. 5. Within the CATV signal 8 and 14 bandwidth ((e.g., 0-1002 MHz, zone "A") response 182 is a conventional −3.5 dB. Within the in-home entertainment signal 52 bandwidth (e.g., 1125-1675 MHz, zone "B"), response 182 is attenuated and equalized to a relatively flat −8 dB. This shows that conditioning device 58 and 158 attenuates and equalizes the in-home entertainment signal 52 bandwidth when coupled to a coaxial device such as a splitter.

Referring to FIG. 7, wherein like numerals indicate like elements from FIG. 2, a topology for another embodiment of a conditioning device 258 is illustrated. Conditioning device 258 includes input node 260 for connection to a distribution port of a conventional splitter. Conditioning device 258 includes two signal paths 262 and 264 which separate CATV signals 8 and 14 from in-home entertainment signals 52. CATV signal 8 and 14 are conducted along first signal path 262. IHE signals 52 are conducted along second signal path 264. The two signal paths 262, 264 are rejoined at an output node 270.

First signal path 262 includes low-pass filter 268 adapted to conduct CATV signals 8 and 14 and reject in-home entertainment signals 52. Low-pass filter 268 is a parallel inductor/capacitor (LC) arrangement in which inductor and capacitor values are selected to yield high isolation between the paths. Resonator or tank elements defined by L2/C2, L3/C3, and L4/C4 and capacitive shunts C1, C5, C6, and C7 collectively form an elliptic filter as shown in FIG. 7. Low-pass filter 268 according to the invention can take many different forms. In some embodiments low-pass filter 268 is a Chebyshev filter. In some embodiments low-pass filter 268 is a Butterworth filter. In some embodiments low-pass filter 268 is a maxflat filter. Low-pass filter 268 according to the invention is any filter which conducts CATV downstream signals 8, conducts CATV upstream signals 14, and rejects IHE signals 52.

Second signal path 264 is in parallel electrical communication with first signal path 262. Second signal path 264 includes high-pass filter 272. In the illustrated embodiment, high-pass filter 272 includes capacitors C8-C11 and inductors L6 and L7 to form a filter path that passes signals in the frequency range of in-home entertainment signal 52 (e.g., 1125-1675 MHz). Capacitors C8 and C10 are connected in series between input node 260 and output node 270. Series connections of L6/C9 and L7/C11 connect to ground the node between input node 260 and C8 and the node between C8 and C10, respectively. High-pass filter 272 as shown in FIG. 7 is an operable embodiment of an elliptic filter, but other filter designs are operable according to the invention as well, such as a Chebyshev filter, a Butterworth filter, a maxflat filter, etc. In some embodiments, second signal path 264 further includes second high-pass filter 276 to permit conditioning device 258 to operate similarly in both directions. Second high-pass filter 276 is an elliptic filter in the embodiment shown in FIG. 7. In some embodiments second high-pass filter 276 is a Chebyshev filter. In some embodiments second high-pass filter 276 is a Butterworth filter. In some embodiments second high-pass filter 276 is a maxflat filter.

Second signal path 264 further includes signal conditioning circuit 274 in series electrical connection with high-pass filter 272. Signal conditioning circuit 274 is configured to attenuate the frequency response of in-home entertainment signals 52 when coupled to a splitter, entry adapter, or the like. In one embodiment, signal conditioning circuit 274 is a Pi-type resistive attenuator comprising three resistors R1, R2, and R3, as shown in FIG. 7. However, other arrangements are contemplated, such as a T-type attenuator. The exemplary signal conditioning circuit 274 within conditioning device 258 provides a response similar to response 182 shown in FIG. 6. Signal conditioning circuit 274 may be configured to provide a level of attenuation that is beneficial to conditioning device 258, but not necessarily the same level of attenuation as shown in response 182 of FIG. 6. In some embodiments, signal conditioning circuit 274 attenuates in-home entertainment signals 52 an amount in the range of −1 dB to −20 dB in response to being coupled to a coaxial device. In some embodiments, signal conditioning circuit 274 attenuates in-home entertainment signals 52 an amount in the range of −5 dB to −10 dB in response to being coupled to a coaxial device. In one embodiment, a level of attenuation of −5 dB in IHE signal 52 frequency range of 1125-1675 MHz has been found to be beneficial. In other examples, a level of attenuation of −8 dB has been found to be beneficial, as shown in FIG. 6. In general, an attenuation level greater than −20 dB is often undesirable. The frequency response of conditioning device 58, 158, or 258 may vary depending upon customer requirements. For example, in some embodiments conditioning device 58, 158, or 258 may be coupled to the end of a long run of coaxial cable, and only −1 dB of attenuation is desired.

The particular topology of signal conditioning circuit 74 is not limited to the specific examples disclosed herein. For example, in some embodiments, the signal conditioning circuit 74 may be realized using chokes, ferrite-element inductors, microstrips, striplines, transformer couplers, and the like.

One advantage provided by conditioning devices according to the invention, including conditioning device 58, 158, and 258, is that CATV signal 8 and 14 frequency response is not degraded in subscriber devices that are not in-home entertainment network-enabled. In other words, non-in-home entertainment network-enabled devices will not be overwhelmed by in-home entertainment signals 52, which may be amplified within the network. For example, referring back to FIG. 1, conventional splitter 40 distributes CATV signals 8 and 14 and, in one embodiment, multimedia-over coax signals 52. In order to improve the multimedia-over-coax signals that are degraded by traversing backwards through entry adapter 22, the multimedia-over-coax protocol may amplify the signal from set-top box 38 to multimedia-over-coax-enabled digital video recorder 38. However, the amplified signal also transmits to the non-multimedia-over-coax-enabled television 46, and the amplified signal may interfere with CATV signals 8 and 14 traveling from and to television 46. Installation of conditioning device 58, 158, or 258 in each distribution port of splitter 40 attenuates the response in the multimedia-over-coax band of frequencies. Also, another advantage is that conditioning device 58, 158, or 258, when coupled to a conventional splitter, provides an additional 6-10 dB of isolation between distribution ports. In one example, the response is flattened to −8 dB in the multimedia-over-coax frequency range of 1125-1675 MHz, and the isolation is increased from −15 dB to approximately −25 dB.

Another advantage provided by the conditioning device according to the invention is that, when coupled to a conventional splitter, the frequency response is flattened in the in-home entertainment range of frequencies, which improves amplification. In other words, amplification by the multimedia-over-coax protocol will result in a uniform strength of signal across the multimedia-over-coax spectrum of frequencies.

Figure 8:
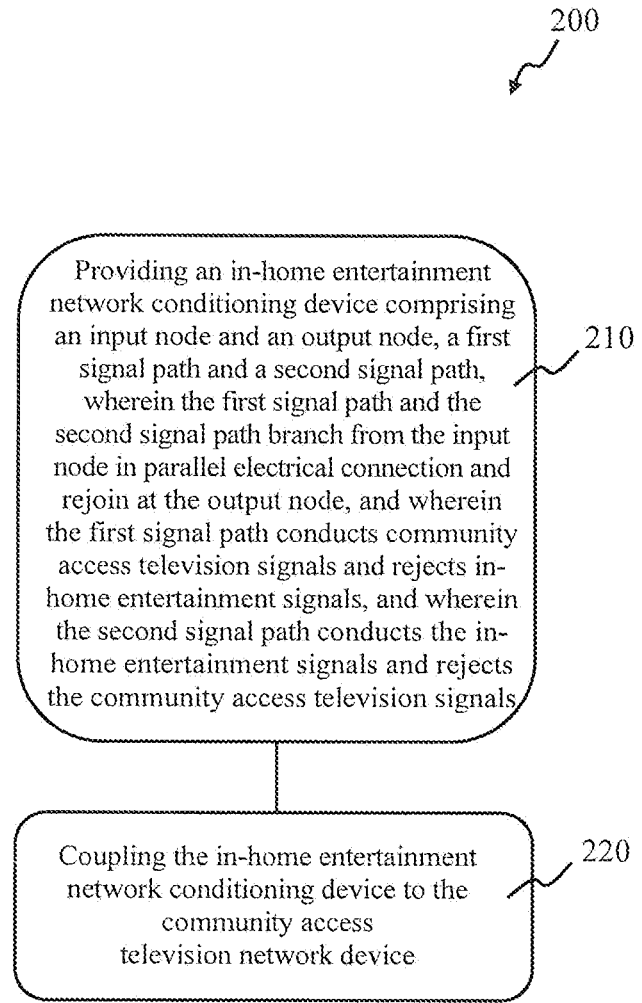
FIG. 8 illustrates method 210 of conditioning in-home entertainment signals in a CATV network device according to the invention.

FIG. 8 shows method 200 of conditioning in-home entertainment signals in a CATV network device according to the invention. Method 200 includes step 210 providing an in-home entertainment network conditioning device comprising an input node and an output node, a first signal path and a second signal path, wherein the first signal path and the second signal path branch from the input node in parallel electrical connection and rejoin at the output node, and wherein the first signal path conducts CATV signals and rejects in-home entertainment signals, and wherein the second signal path conducts the in-home entertainment signals and rejects the CATV signals. Method 200 also includes step 220 coupling the in-home entertainment network conditioning device to the CATV network device. In some embodiments the first signal path includes a low-pass filter. In some embodiments the second signal path includes a high-pass filter. In some embodiments the second signal path includes a signal conditioning circuit. In some embodiments the second signal path includes a second high-pass filter. In some embodiments the signal conditioning circuit includes an equalizer. In some embodiments the equalizer has a positive gain slope in the in-home entertainment signal frequency range. In some embodiments the equalizer includes resistive elements. In some embodiments the CATV network device includes an entry adapter. In some embodiments the signal conditioning circuit comprises an attenuator. In some embodiments the in-home entertainment network conditioning device attenuates IHE signal an amount in the range of −1 dB to −30 dB when coupled to the CATV network device. In some embodiments the in-home entertainment network conditioning device attenuates IHE signal an amount in the range of −5 dB to −10 dB when coupled to the CATV network device.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment. For example, the topologies illustrated in FIGS. 2, 4, and 7 may be stand-alone device or topology incorporated into splitter.

The invention claimed is:

1. An in-home entertainment network conditioning device for use with a coaxial device, the conditioning device comprising:
   an input node, wherein:
      the input node conducts community access television (CATV) signals and in-home entertainment signals, the community access television signals comprising:
         downstream signals in a first frequency range; and
         upstream signals in a second frequency range that is different from the first frequency range; and
      the in-home entertainment signals comprise signals in a third frequency range that is different from the first frequency range and the second frequency range;
   a first signal path branched from the input node, wherein the first signal path comprises a low-pass filter, wherein the low-pass filter conducts the upstream and downstream community access television signals and wherein the low-pass filter rejects the in-home entertainment signals;
   a second signal path branched from the input node and in parallel electrical communication with the first signal path; and
   an output node joining the first signal path and the second signal path;
   wherein the second signal path comprises:
      a first high-pass filter in series electrical connection with a signal conditioning circuit, wherein the first high-pass filter conducts the in-home entertainment signals and rejects the upstream and downstream community access television signals, and wherein the first high-pass filter is connected electrically between the input node and the signal conditioning circuit, and wherein the signal conditioning circuit attenuates the in-home entertainment signals and passes the upstream and downstream CATV signals without attenuation in response to being coupled to the coaxial device; and
      a second high-pass filter in series electrical connection with the signal conditioning circuit, wherein the second high-pass filter conducts the in-home entertainment signals and rejects the upstream and downstream community access television signals, and wherein the second high-pass filter is connected electrically between the signal conditioning circuit and the output node.

2. The conditioning device of claim 1, wherein the signal conditioning circuit comprises an equalizer, wherein the equalizer equalizes a frequency response of the in-home entertainment network conditioning device in the third frequency range, in response to being coupled to the coaxial device.

3. The device of claim 1, wherein the signal conditioning circuit attenuates in-home entertainment signals an amount in the range of −1 decibels to −30 decibels in response to being coupled to a coaxial device.

4. The device of claim 1, wherein the signal conditioning circuit attenuates in-home entertainment signals an amount in the range of −5 decibels to −10 decibels in response to being coupled to a coaxial device.

5. The conditioning device of claim 1, wherein a frequency response of the in-home entertainment network conditioning device has a positive gain slope in the third frequency range.

6. The conditioning device of claim 1, wherein the low-pass filter of the first signal path comprises a Chebyshev filter.

7. The conditioning device of claim 1, wherein the high-pass filter of the second signal path comprises a Chebyshev filter.

8. The conditioning device of claim 1, wherein the second high-pass filter of the second signal path comprises a Chebyshev filter.

9. The conditioning device of claim 1, wherein the first frequency range is from 54-1002 megahertz, the second frequency range is from 5-42 megahertz, and the third frequency range is from 1125-1675 megahertz.

10. A signal conditioning circuit for use in a community access television (CATV) network device, wherein:
   the CATV network device conducts:
      downstream CATV signals in a first frequency range;
      upstream CATV signals in a second frequency range, wherein the second frequency range does not overlap the first frequency range; and
      in-home entertainment signals in a third frequency range, wherein the third frequency range does not overlap either the first frequency range or the second frequency range;
   the CATV network device comprises:
      a first signal path, wherein the first signal path comprises a low-pass filter which passes both the upstream and the downstream community access television signals, and rejects the in-home entertainment signals; and
      a second signal path in parallel electrical connection to the first signal path, wherein the second signal path comprises a first and a second high-pass filter, and wherein both the first and the second high-pass filters pass the in-home entertainment signals, and wherein both the first and the second high-pass filters reject both the upstream and the downstream community access television signals;
   the signal conditioning circuit is electrically coupled to the second signal path in series electrical connection between the first and the second high-pass filters;
   the signal conditioning circuit comprises an equalizer circuit; and
   the signal conditioning circuit attenuates the in-home entertainment signals and passes the upstream and downstream CATV signals.

11. The device of claim 10, wherein a frequency response of the equalizer circuit has a positive gain slope in the in-home entertainment signal frequency range.

12. The device of claim 11, wherein the in-home entertainment signal frequency range is from 1125-1675 megahertz.

13. The device of claim 10, wherein the equalizer circuit comprises resistive elements.

14. The device of claim 13, wherein the resistive elements comprise a Pi-type attenuator.

15. A method of conditioning in-home entertainment signals in a community access television (CATV) network device comprising the steps of:
- separating CATV signals from in-home entertainment signals, wherein the CATV signals comprise:
  - downstream signals in a first frequency range; and
  - upstream signals in a second frequency range that is different from the first frequency range;
  - and wherein the in-home entertainment signals are in a third frequency range that is different from both the first and the second frequency range;
- filtering the in-home entertainment signals with a first high-pass filter, wherein the first high-pass filter rejects the downstream and the upstream CATV signals, and wherein the first high-pass filter passes the in-home entertainment signals;
- attenuating the filtered in-home entertainment signals in the third frequency range with a signal conditioning circuit;
- filtering both the upstream and the downstream CATV signals with a low-pass filter, wherein the low-pass filter passes both the upstream and the downstream CATV signals, and wherein the low-pass filter rejects the in-home entertainment signals; and
- combining the filtered upstream and downstream CATV signals with the filtered and attenuated in-home entertainment signals.

16. The method of claim 15, further comprising the step of filtering the filtered and attenuated in-home entertainment signals with a second high-pass filter, wherein the second high-pass filter rejects the downstream and the upstream CATV signals, and wherein the second high-pass filter passes the in-home entertainment signals.

17. The method of claim 16, wherein the signal conditioning circuit comprises an equalizer.

18. The method of claim 17, wherein the signal conditioning circuit has a frequency response with a positive gain slope in the in-home entertainment signal frequency range.

19. The method of claim 18, wherein the signal conditioning circuit comprises resistive elements.

* * * * *